Jan. 29, 1963  P. S. ROE  3,075,620
AUTOMATIC ADJUSTER
Filed Dec. 23, 1959  2 Sheets-Sheet 2

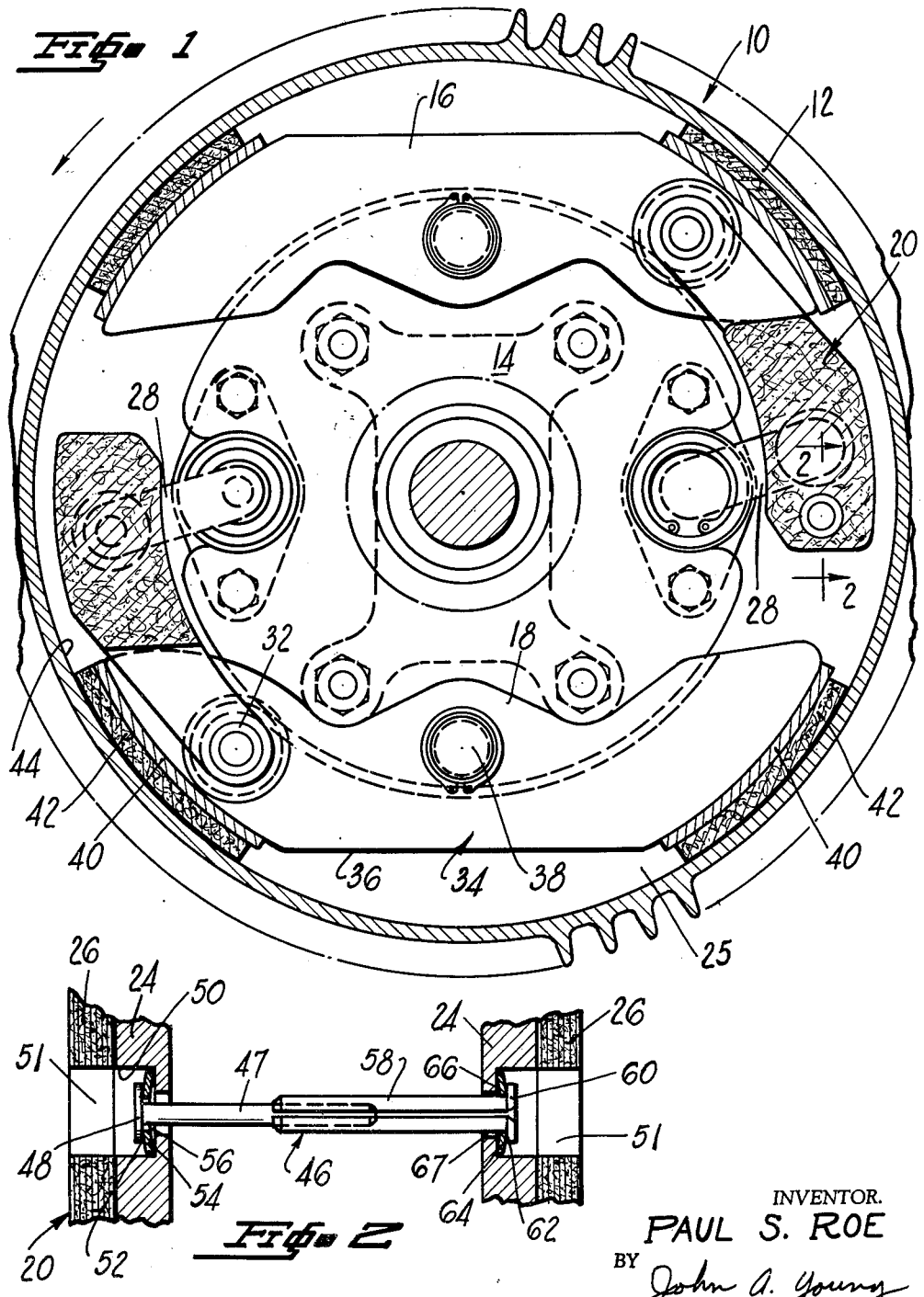

INVENTOR.
PAUL S. ROE
BY John A. Young
ATTORNEY

# United States Patent Office 3,075,620
Patented Jan. 29, 1963

3,075,620
AUTOMATIC ADJUSTER
Paul S. Roe, South Bend, Ind., assignor to The Bendix Corporation, a corporation of Delaware
Filed Dec. 23, 1959, Ser. No. 861,519
1 Claim. (Cl. 188—71)

This invention relates to an automatic adjuster for laterally applied friction elements, that is, friction elements which are actuated along a line parallel to the axis of rotation of the rotor which is engaged by the friction elements.

While the arcuate shoe brake has proved satisfactory for many years in meeting the braking requirements for automobiles in most countries including the United States, a further design of brakes, known as the disk brake has gained considerable favor, chiefly because of its resistance to fade or loss of braking effectiveness at higher brake operating temperatures. It is inevitable, that a brake will generate some heat since its principle of operation is to convert the kinetic energy of the vehicle into frictional heat and the response of the brake to that heat is a major concern to brake engineers. It is generally accepted, that the disk brake does tend to dissipate the heat somewhat more efficiently than does the shoe brake and this is its main advantage.

It is one of the objects of the present invention, to provide an automatic adjuster for the friction members of a disk brake so that as the friction member wears, its retracted or released position is adjusted and the brake running clearance remains substantially constant regardless of the wear which is incident to brake usage.

It is a further object of the invention to provide an automatic adjuster which is readily adapted to a wide variety of disk brake constructions including those wherein the disk elements servo apply a shoe friction element, and in another embodiment in which the disk elements are of the "caliper" design.

A further object of the invention is to provide an automatic adjuster which is extremely simple in operation and in construction and can therefore be provided at an insubstantial cost. Although the automatic adjuster possesses simplicity, its operation is dependable and it will provide accurate consistent operation regardless of braking conditions such as high heat and rugged sustained usage.

Other objects and features of the invention will become apparent from a consideration of the following description which proceeds with reference to the accompanying drawings, wherein a plurality of embodiments for the invention are explained by way of example. In the drawings:

FIGURE 1 is a side elevation view of a combination brake having both disk and shoe friction elements both of which are energized during brake application;

FIGURE 2 is a section view taken on line 2—2 of FIGURE 1;

Figure 3:
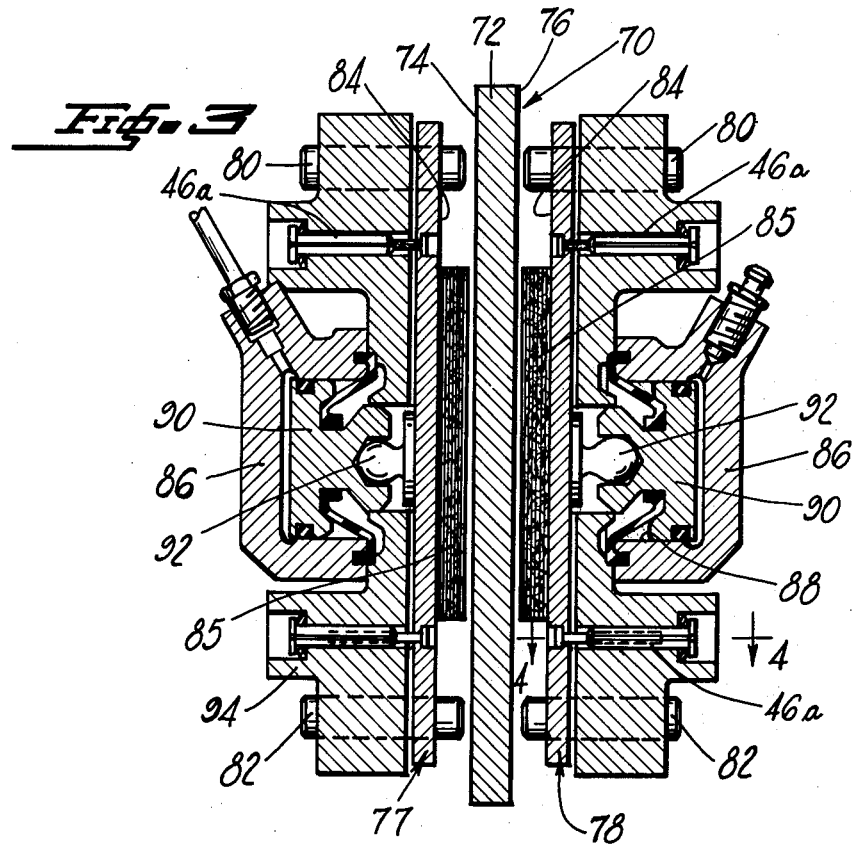
FIGURE 3 is a section view of a disk brake in which the disk friction elements are separately applied and are not connected by way of servo application; and, FIGURE 4 is a section view taken along line 4—4 of FIGURE 3.

Referring now to the drawings, FIGURE 1 shows a composite disk and and shoe brake, designated generally by reference numeral 10, which includes a rotor 12 and a stator plate 14. The brake comprises two units 16 and 18 each of which are identically constructed so that only one will be described in detail. The brake unit 16 includes two laterally applied friction elements 20 each comprising a backing 24 with a segment of friction material 26 which is forcibly applied against spaced annular surfaces 25 of rotor 10, the one annular surface 25 being broken away to better illustrate the brake. The two friction members 20 are spread by means of articulated levers 28 operated by a fluid motor. Particulars of actuation of the brake, which form part of the present invention, are fully described in U.S. Patent 2,888,105 issued May 26, 1959. The two friction members 20 are connected through an adapter fitting 32 with a shoe friction element 34 having a web 36 mounted for pivotal movement on anchor 38 and two spaced rims 40 each having an arcuate lining segment 42 which is applied against a cylindrical surface 44 of the rotor 12.

Referring to FIGURE 2, between each of the friction elements 20 is an automatic adjuster 46 which limits retractile movement of the friction element 20 and comprises a stem 47 having a boss 48 received within openings 50, 51 of friction element 20 and providing a shoulder 52 which bears against a beveled or dished washer 54 which is seated within the recess 56. The stem 46 is passed through a counterbore opening 57 and is frictionally fitted within a split sleeve 58 having a boss 60 providing a shoulder 62 bearing against beveled or dished washer 64 likewise seated within a recess 66 of the friction member 20. The sleeve 58 passes through a counterbore opening 67 as shown in FIGURE 2.

In operation, when the brakes are actuated, the two friction members 20 are spread apart but the resistance to frictional sliding movement between the stem 47 and sleeve 58 is sufficient so that during the initial spreading movement of the friction members 20 the two dished washers 54 and 64 are first flattened and thereafter, any further axial spreading movement of the friction members 20 causes the stem 46 to slide within sleeve 58 so that when the brakes are released, each beveled washer 54 when resuming its original shape, will pull back each friction member 20 by an amount necessary to establish running clearance between the friction material lining 26 and the opposed annular friction surfaces 25 of the rotor 12. In overall operation therefore, regardless of the amount of movement of the friction members on their applying stroke, the retractile stroke is substantially the same so that running clearance is maintained regardless of the extent of wear of the friction lining 26 and the brakes are therefore in constant proper adjustment throughout the wear life of the liner 26.

When the friction members 26 are engaged with the rotor, each will tend to move with the rotor in a clockwise or counterclockwise circumferential direction and in so doing, will rock the shoe friction element 18 either clockwise or counterclockwise about the anchor 38 to apply one or the other of its shoe friction elements. No adjustment is provided or is necessary for either shoe friction element since it is applied by the engagement of the disk friction element and does not affect the pedal or displacement requirements of the brake. One of the primary reasons for having a self-adjusting brake is so that the brake pedal will not change appreciably in its stroke and since the pedal stroke is not affected by the shoe friction element then an adjuster may be omitted for this portion of the brake.

Figure 4:
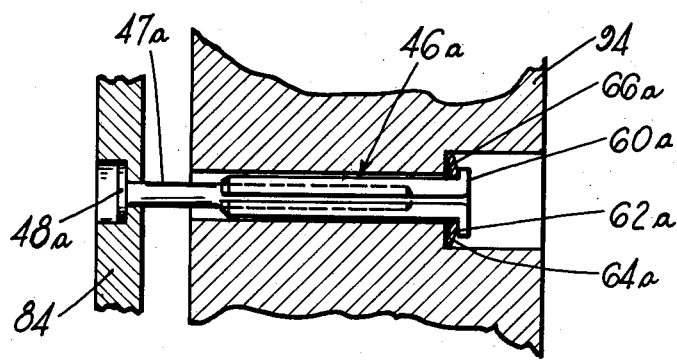

Referring next to the embodiment shown in FIGURES 3 and 4 there is shown a disk or caliper type brake the specific construction of which forms no part of the present invention, but which is shown and described at length in application No. 645,715 filed March 13, 1957, now Patent No. 2,973,837. The brake, which is designated generally by reference numeral 70, includes a rotor 72 having opposed annular friction surfaces 74 and 76 engageable by friction members 77 and 78 which are axially movable on anchors 80, 82 at their opposite ends. Each friction member has a backing 84 and a segment of lining 85 which forms the friction surface engageable with the opposing rotor surface. Each friction member 77, 78 is actuated by means of a fluid motor 86 comprising a cylinder housing 88 and piston 90 having a ball socket connection 92 with the friction member. The fluid motor actuator is bolted or carried by a housing 94 which is U-shaped and has limbs extending closely adjacent each of the opposite sides 74, 76 of the rotor. At the opposite ends of each friction member is a combination retracting and adjusting means which is similar on construction to that shown in FIGURE 2 and is designated generally by reference numeral 46a, FIGURES 3 and 4. Parts corresponding to these in the previous embodiment will receive the same reference numeral but include the subscript "a." A sleeve 58a is split along its length similarly to that in the previous embodiment and is provided with a boss 60a which forms a shoulder 62a bearing against a curved washer 64a located within recess 66a of the one limb of the caliper housing 94. The stem 47a which is slidably mounted in sleeve 58a has an enlarged head 48a which is connected to the backing 84 of the friction member 78.

In operation, as the friction material lining 85 moves into engagement with the rotor 72 its axial movement will pull the stem 47a therewith and the frictional fitting between the stem 47a and the sleeve 58a will cause the flat washer 64a to flatten, until the boss 60a is held fast and further movement of the friction member is possible only by sliding the stem 47a through the sleeve 58a so that when the brake is released, the washer 64a in resuming its original position, will retract the sleeve 58a, stem 47a and friction member attached therewith through head 48a causing the friction member to be disengaged from the rotor and retracted by an amount equal to movement of the dished washer 64a from its flattened to its dished shape. As a result of operation of the automatic adjuster 46a the friction member 78 will be retracted by substantially the same amount regardless of the extent of protractile movement. That is, the amount of retractile movement of the friction member will always be in accordance with flattening of the dished washer 64a and its subsequent movement to a dished condition and all axial movement of the friction member in excess of that related to the washer 64a causes the stem 47a to slide relatively to the split sleeve 58a.

The adjuster 46a thereby serves the two functions of maintaining the friction member in a proper retractile or adjusted position regardless of the extent of its wear and serves the further function of positively disengaging the liner 86 when the brake is released.

Although the present invention has been described in connection with only two selected example embodiments, it will be understood that these are merely illustrative of the invention and are in no sense restrictive of the invention. It is reasonably to be expected that those skilled in the art will make revisions and adaptations of the invention while incorporating the herein disclosed principles. It is intended that such revisions and adaptations as incorporate the herein disclosed principles will be included within the scope of the following claim as equivalents of the invention.

I claim:

In a brake, two friction members each having flat friction surfaces, a rotor having friction faces engageable by said friction members, actuating means for moving said friction members in opposite directions, an opening in each of said friction members, said openings being aligned with each other, an annular shoulder surrounding each said opening, a pin having a boss on one end thereof, a split sleeve having a boss on one end thereof and one way gripping means on the other end, said pin and said split sleeve each being slidably disposed within a respective opening with the boss of each engaging a respective shoulder to limit movement of said pin and said split sleeve toward each other relative to their respective friction members, said pin being received within said other end of said sleeve for relative slidable movement therebetween away from each other only, and a resilient annular member disposed between each of said shoulders and each said boss for biasing each boss away from their respective shoulders, whereby upon actuation said friction members can move a predetermined distance away from each other before relative slidable movement between said pin and sleeve is produced to effect automatic adjustment of the retracted distance between said friction members and their respective rotor friction surfaces.

References Cited in the file of this patent

UNITED STATES PATENTS

| | | |
|---|---|---|
| 2,531,341 | Meador | Nov. 21, 1950 |
| 2,830,680 | Hawley | Apr. 15, 1958 |
| 2,888,105 | Burnett | May 26, 1959 |
| 2,888,109 | Tankersley | May 26, 1959 |
| 2,920,721 | Dodge | Jan. 12, 1960 |

FOREIGN PATENTS

| | | |
|---|---|---|
| 200,718 | Australia | Jan. 25, 1956 |
| 1,160,808 | France | Mar. 10, 1958 |